(No Model.)

A. J. DODGE.
FRUIT DRIER.

No. 331,382. Patented Dec. 1, 1885.

Witnesses
John Edwards Jr.
Eddy N. Smith

Inventor
Albert J. Dodge,
By James Shepard
Atty.

UNITED STATES PATENT OFFICE.

ALBERT J. DODGE, OF PETERBOROUGH, NEW HAMPSHIRE.

FRUIT-DRIER.

SPECIFICATION forming part of Letters Patent No. 331,382, dated December 1, 1885.

Application filed November 19, 1884. Serial No. 148,357. (No model.)

*To all whom it may concern:*

Be it known that I, ALBERT J. DODGE, a citizen of the United States, residing at Peterborough, in the county of Hillsborough and State of New Hampshire, have invented certain new and useful Improvements in Fruit-Driers, of which the following is a specification.

My invention relates to improvements in fruit-driers of the class in which the fruit to be dried is placed in trays one under the other, and then elevated a little from the heater as each successive tray is placed in position.

Figure 1:
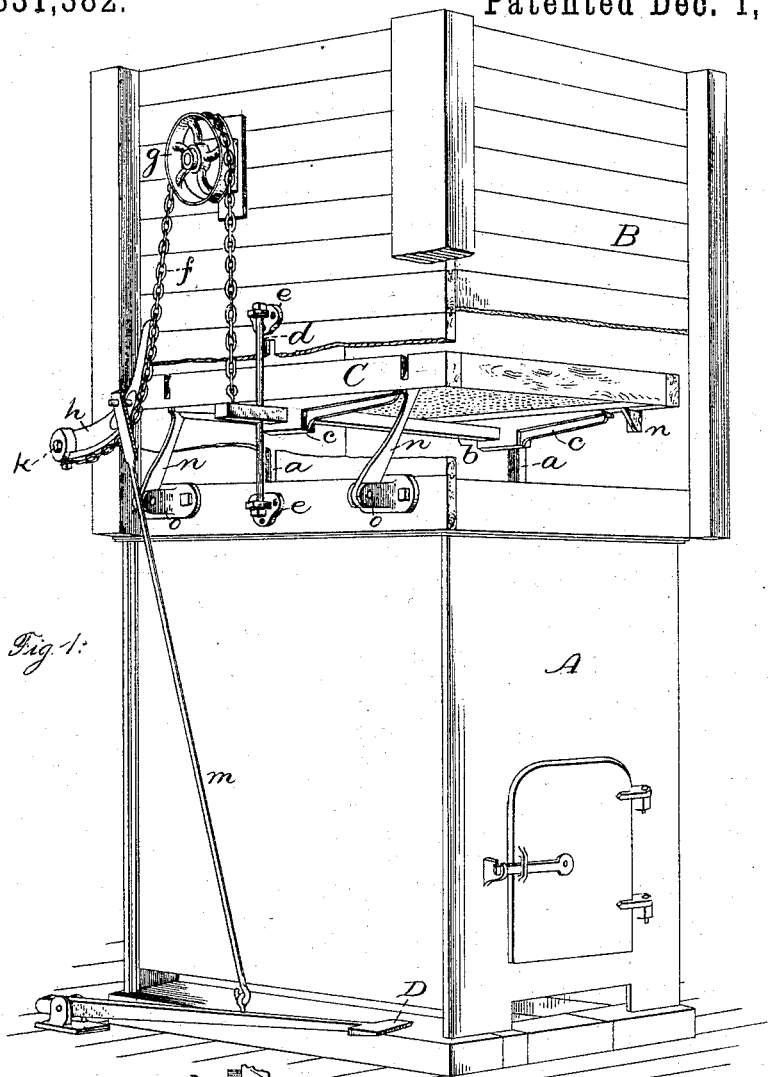
Figure 2:
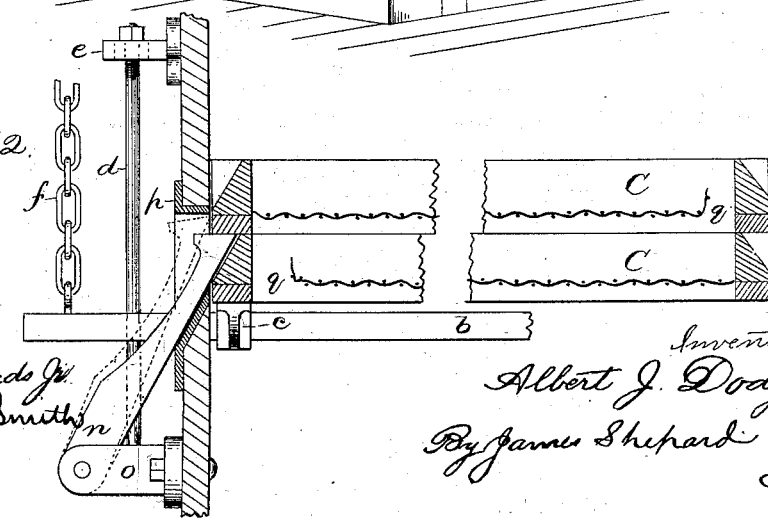

In the accompanying drawings, Figure 1 is a perspective view of one of my fruit-driers, the same being represented with the sides of the receiver broken away in order to better show the parts, and Fig. 2 is a detached sectional view of a portion thereof.

A designates the hot-air box, which may be supplied with hot air from any ordinary source. Above the hot-air box, and communicating therewith, is the receiver B, the same consisting of a box-like frame inclosed on all four sides, but open at the top. At the front or lower right-hand side, as shown in the drawings, there is an opening left for the introduction of the trays, which opening may be provided with a door or slide for closing it, if desired. Extending across the bottom of the receiver, and working in vertical slots $a$ $a$ in the two sides thereof, is a shaft or bar, $b$. Upon this shaft are two cross-bars or brackets, $c$, upon which to place the drying-trays C. Vertical rods $d$, arranged upon the outside of the receiver and passing through holes at the ends of the shaft $b$, serve as ways or guides upon which the shaft $b$ moves vertically. This rod is supported in suitable brackets, $e$, which may be slotted, if desired, to adjust the ends of the rods to make them coincide with the holes in the shaft $b$. To each end of the shaft $b$ a chain, $f$, is secured, which chain extends upward over a pulley, $g$, and then downward to the hub of the cam $h$, to which it is secured. This cam $h$ is secured to a shaft, $k$, which extends across the rear of the receiver. A like cam is secured to the opposite end of the shaft $k$, and a like chain, $f$, and pulley $g$ are also upon the opposite side of the receiver B. The cam $h$ is operated by the foot-treadle D and connecting-rod $m$. In Fig. 1 the parts are represented with the treadle D depressed far enough to elevate a tray into position to be caught by the catches $n$. These catches $n$, of any desired number, are hinged or pivoted within brackets $o$ upon the outside of the receiver, and they slant inward through the walls of the receiver, so as to project therein, as shown. The slot or openings through which the catches pass may be lined and protected by suitable sockets, $p$, Fig. 2. It will be seen that they are so pivoted that their weight will cause them to drop into place, while their under inside edge is inclined so that anything pushed up by them will slide smoothly over them and push the catch back out of the way. In other words, their action is automatic. The trays C are of box-like form, with wire-cloth bottoms, but with the wire-cloth turned up at one end, as at $q$, Fig. 2, so as to form a guard, while the wire-cloth is so short as to leave a space between it and the end of the tray, while the turned-up portion or guard, which extends upward to a less height than the side bars, will effectually divide the wire-cloth bottom from said space and prevent the fruit from falling through said opening. The sides of the trays are notched upon the outside upper corners at points which coincide with catches $n$ upon the receiver.

The operation is as follows: A tray filled with fruit is placed upon the arms or brackets $c$ $c$ of the lifter and the treadle D is depressed so as to throw the cams $h$ against the chains $f$ to deflect them, as shown in Fig. 1, and to thereby raise the shaft $b$, and consequently the tray C. In thus passing upward the tray pushes the catches $n$ out of the way, and as soon as it passes above their ends the catches fall back into position and hold the tray, as shown in Fig. 1. The treadle is then released, thereby allowing the shaft $b$ and its brackets $c$ to drop down low enough to receive another tray, while the tray last placed upon them is held in its elevated position by the catches. After a certain lapse of time, when the desired amount of heat for this stage of the operation has been given to this tray, another tray is placed upon the lifter and elevated as before. The notches in the trays permit one tray to be raised until it comes in contact with the bottom of the tray above it, as shown in Fig. 2, before the bottom tray acts to push the catches $n$ outward, whereby all the weight of the upper tray or trays is removed from the catches before they are acted upon by the bottom tray. By the continued upward movement of the lifter and the bottom tray the catches are thrown back and again drop in under the tray last lifted, to hold up not only the last tray, but also that or those which may be resting upon it. Tray after tray is thus added at suitable intervals of time, and they are gradually lifted farther away from the heat and to any desired height. When the series of trays placed one upon another are lifted so high as to extend above the top of the receiver B, the side walls of the trays themselves will constitute a suitable chute or flue for directing the hot air in its upward course. At the desired point one tray can be taken from the top for every one that is placed in the receiver below.

I prefer to use trays of the construction shown in Fig. 2; but some parts of my invention are not necessarily limited to this construction. When said trays are used, I intend to place the fruit in thicker layers within the tray than is ordinarily the case, and to place it so thick that the current of hot air will not readily pass directly up through the fruit, but will mainly pass up through the opening $q$ at the end of the tray. The trays are placed in position with the openings at the ends alternating, as shown in Fig. 2, so that the current of hot air passes in a sort of serpentine form between the several layers of fruit and coming in contact with both sides thereof.

The open-top receiver I consider of great importance. When used in connection with trays the sides of which when stacked one upon the other form a chute to confine the ascending current of hot air, the receiver can be made of only a moderate height, and the trays filled with fruit may extend indefinitely above the open top of the receiver. So far as I know, prior fruit-driers of this class are organized upon a plan which contemplates the removal of the top tray when it shall reach a given height. In the use of my machine if after a given number of trays are stacked one upon the other it is found that the fruit in the upper tray is not sufficiently dry, said tray may be allowed to remain on the stack and then be carried higher by the addition at the bottom of other trays, and thus remain as long as may be desired to dry the fruit properly. If it was necessary to remove the top tray at a given height, then no more trays could be added to the bottom of the stock until the upper tray is dry enough to remove. In connection with thus carrying the trays to an indefinite height the notched trays and my catches are quite important, because no matter how great the weight may be that is supported by the catches the catch-tripping faces—that is, the bottoms of the notches—do not act at all to move the catches out from under the bottom tray until after the weight of the trays above the catches has been wholly removed from said catches, and consequently the catches are always easily operated.

I am aware that fruit-driers are old in which a series of trays are placed one under the other and successively lifted by a mechanical device, and I do not claim the same, broadly.

I am also aware that prior patents show automatic catches on the receiver of fruit-driers; that the mechanism for lifting the trays in one drier of this class is shown in a prior patent as consisting of a lever, treadle, and connecting-rods, and that another patent shows trays having a wire-cloth bottom which is flat throughout its whole extent, and with a space between the end of the wire-cloth and the end of the tray. All of said prior art is hereby disclaimed.

I claim as my invention—

1. The combination of the receiver B, the shaft or bar $b$, extending through said receiver and having tray-receiving brackets, the shaft $k$, extending from side to side of the receiver and set substantially parallel to the bar $b$, the cams $h$, secured to the shaft $k$, and having each a face adapted to press against a chain, the chains $f$, each having one end secured to one end of the bar $b$, while their opposite ends are secured, respectively, to the cams $h$, the pulleys $g$, over which the chains run, the treadle D, and the rod $m$, which connects it with one of the cams $h$, substantially as described, and for the purpose specified.

2. The combination of a suitable frame, the shaft or bar $b$, adapted to be raised and lowered within said frame, the cam $h$, mounted on a suitable axis, the chain $f$, having one end attached to said cam, while the opposite end is secured to the bar $b$, the pulley over which said chain runs, and means for operating said cam for forcing one edge against the chain in deflecting it and thereby raising the bar $b$, substantially as described, and for the purpose specified.

ALBERT J. DODGE.

Witnesses:
EZRA M. SMITH,
JOHN R. MILLER.